US008172036B2

(12) United States Patent
Tanielian

(10) Patent No.: US 8,172,036 B2
(45) Date of Patent: May 8, 2012

(54) APPARATUS AND METHOD FOR PROVIDING ACOUSTIC METAMATERIAL

(75) Inventor: Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/879,457

(22) Filed: Sep. 10, 2010

(65) Prior Publication Data

US 2012/0061176 A1 Mar. 15, 2012

(51) Int. Cl.
*F16F 7/00* (2006.01)

(52) U.S. Cl. ............ 181/207; 181/206; 181/284; 5/716; 52/144; 52/145; 428/116; 428/117; 428/118; 428/119; 428/120

(58) Field of Classification Search .................. 181/206, 181/207, 284; 428/116, 117, 118, 119, 120; 52/144, 145; 5/716
See application file for complete search history.

(56) References Cited

U.S. PATENT DOCUMENTS

| | | | | |
|---|---|---|---|---|
| 2,541,159 | A * | 2/1951 | Geiger | 181/208 |
| 4,373,608 | A * | 2/1983 | Holmes | 181/202 |
| 5,241,512 | A * | 8/1993 | Argy et al. | 367/1 |
| 7,249,653 | B2 * | 7/2007 | Sheng et al. | 181/290 |
| 7,395,898 | B2 * | 7/2008 | Yang et al. | 181/286 |
| 7,685,709 | B2 * | 3/2010 | Hantschel et al. | 29/879 |
| 7,770,693 | B2 * | 8/2010 | Uejima | 181/294 |
| 2002/0046901 | A1 * | 4/2002 | Zapfe | 181/206 |

FOREIGN PATENT DOCUMENTS

| | | | |
|---|---|---|---|
| FR | 2 536 195 | A1 | 5/1984 |
| FR | 2 870 160 | A1 | 11/2005 |
| JP | 06149271 | A * | 5/1994 |

OTHER PUBLICATIONS

Huang H H et al: "Wave Attentuation Mechanism in an Acoustic Metamaterial with Negative Effective Mass Density"; New Journal of Physics, Institute of Physics Publishing, Bristol, GB; vol. 11, No. 1; Jan. 1, 2009; p. 13003; XP020154288.
International Search Report and Written Opinion from International Application No. PCT/US2011/047309, mailed Dec. 8, 2011.

* cited by examiner

*Primary Examiner* — Forrest M Phillips
(74) *Attorney, Agent, or Firm* — Alston & Bird LLP

(57) ABSTRACT

A method for fabricating an acoustic metamaterial may include providing a planar pattern of springs arranged in columns and rows and separated from each other by interconnection nodes, providing a planar pattern of mass units separated from each other by a distance corresponding to a distance between the interconnection nodes, providing an array of vertically oriented springs separated from each other by the distance between the interconnection nodes, and aligning and joining the planar pattern of springs, the planar pattern of mass units and the array of vertically oriented springs to form a layer of unit cells.

20 Claims, 8 Drawing Sheets

APPARATUS AND METHOD FOR PROVIDING ACOUSTIC METAMATERIAL

TECHNOLOGICAL FIELD

Figure 1A:
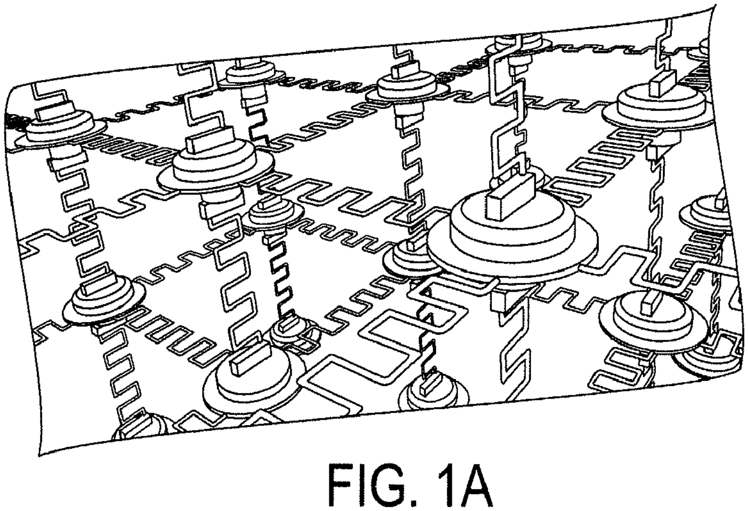

Embodiments of the present disclosure relate generally to metamaterial and, more particularly, to a method and apparatus for providing a practical acoustic metamaterial.

BACKGROUND

Providing protective gear, for personnel, equipment and components has evolved significantly over the years. The practice of equipping machinery or personnel with shielding, armor or other protective materials has proved useful in preventing or reducing the extent of injury, preventing or minimizing damage to tissue or components, and providing for a robust capability to continue uninterrupted operation. For example, many materials that are exposed to potential damage in the aerospace industry or in other environments where significant concussive forces are encountered may use protective gear to extend component life and improve operation. Electrical and/or mechanical components that may otherwise be subjected to harsh conditions under normal or casualty situations may also benefit from shielding provided by protective gear.

In the past, the strength and weight of materials often became the focal issues of concern in relation to development of protective gear. In this regard, for example, design concerns often focused on striking a proper balance between the amount of protection that could be provided and the amount of mobility or flexibility that could simultaneously be afforded.

Modern protective gear designed to minimize or prevent damage from shrapnel and other projectiles has been developed. However, concussive forces associated with explosions, propulsive forces or other impacts are also a significant concern. To address the need for providing protection from concussive forces, acoustic metamaterial has been developed. However, construction of acoustic metamaterial has remained a relatively complex and difficult problem. In particular, although small amounts of acoustic metamaterial may be fabricated, it is often difficult to produce metamaterial with flexibility in terms of the amount and form factor of the material produced to make it practical for use in real-world applications such as noise management and vibration isolation applications in aerospace systems (e.g., airplane cabins, helicopters, satellites, rocket fairings and/or the like) and other areas. Accordingly, it may be desirable to provide a more practical acoustic metamaterial and corresponding fabrication approach.

BRIEF SUMMARY

Some embodiments of the present disclosure relate to an acoustic metamaterial that is both effective and practical. In other words, some embodiments may provide an acoustic metamaterial that exhibits good performance and is also relatively easy to fabricate given current technology levels. Accordingly, some embodiments may provide an approach for fabricating unit cells of acoustic metamaterial that may be practical for use and fabrication in a scalable, flexible and versatile manner.

In one example embodiment, a method for providing a practical acoustic metamaterial is provided. The method may include providing a planar pattern of springs arranged in columns and rows and separated from each other by interconnection nodes, providing a planar pattern of mass units separated from each other by a distance corresponding to a distance between the interconnection nodes, providing an array of vertically oriented springs separated from each other by the distance between the interconnection nodes, and aligning and joining the planar pattern of springs, the planar pattern of mass units and the array of vertically oriented springs to form a layer of unit cells.

In another example embodiment, an acoustic metamaterial is provided. The acoustic metamaterial may include a cubic lattice of mass units, a first array of springs lying in a first plane, a second array of springs lying in a second plane, and a plurality of springs disposed substantially perpendicular to the first and second planes. The first array of springs may be disposed to connect each mass unit therein to one adjacent mass unit lying in the first plane with a corresponding one of the springs. Each of the springs may be connected to a particular mass unit extending in a direction substantially perpendicular to a direction of extension of an adjacent spring connected to the particular mass unit. The second plane may lie parallel to the first plane. The second array of springs may connect each mass unit therein to one adjacent mass unit lying in the second plane. The plurality of springs may be arranged to connect mass units lying in the first plane to respective adjacent mass units lying in the second plane.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWING(S)

Figure 1B:
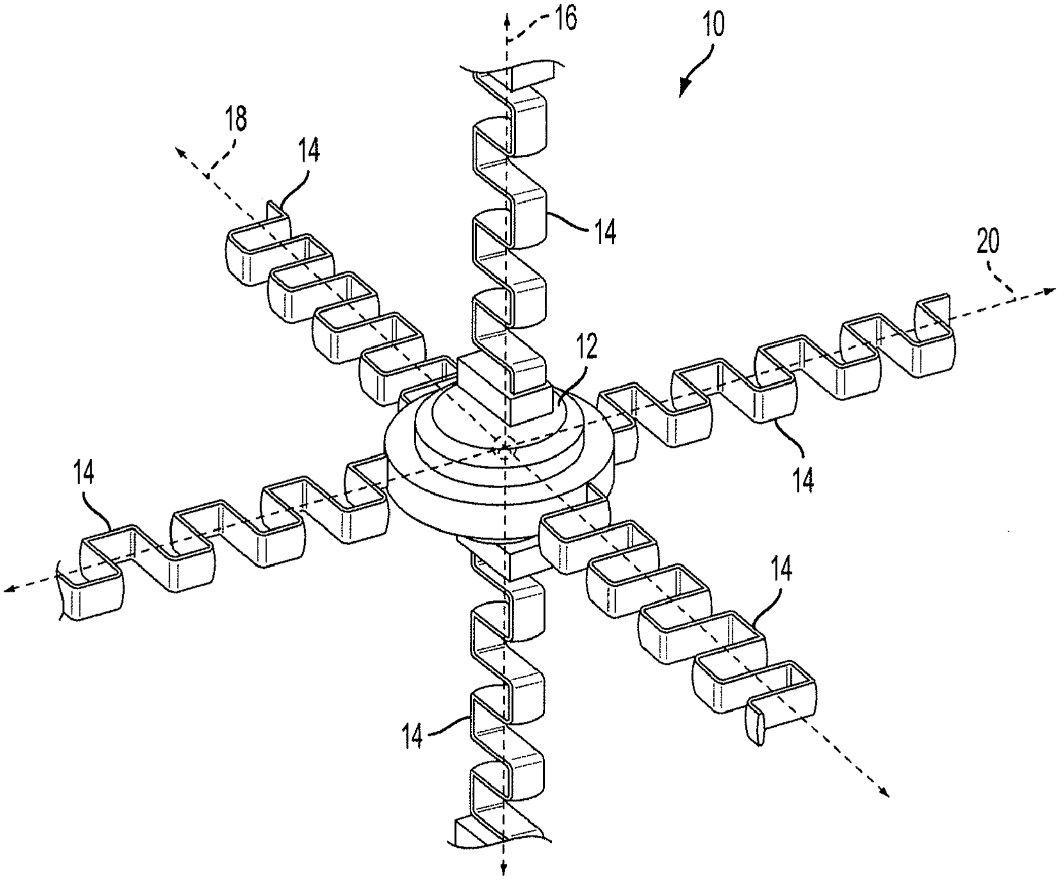
Figure 2A:
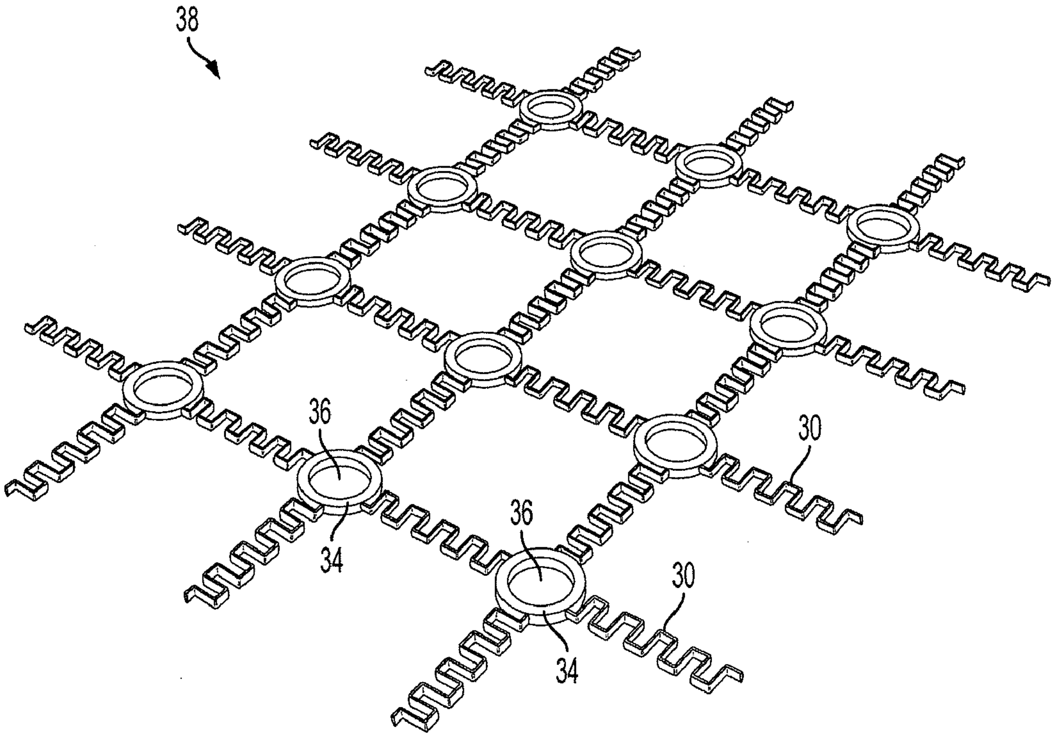
Figure 2B:
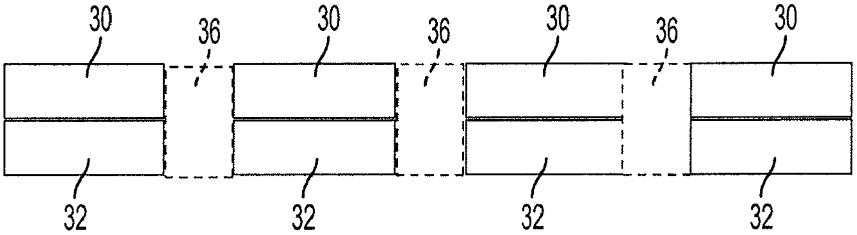
Figure 3A:
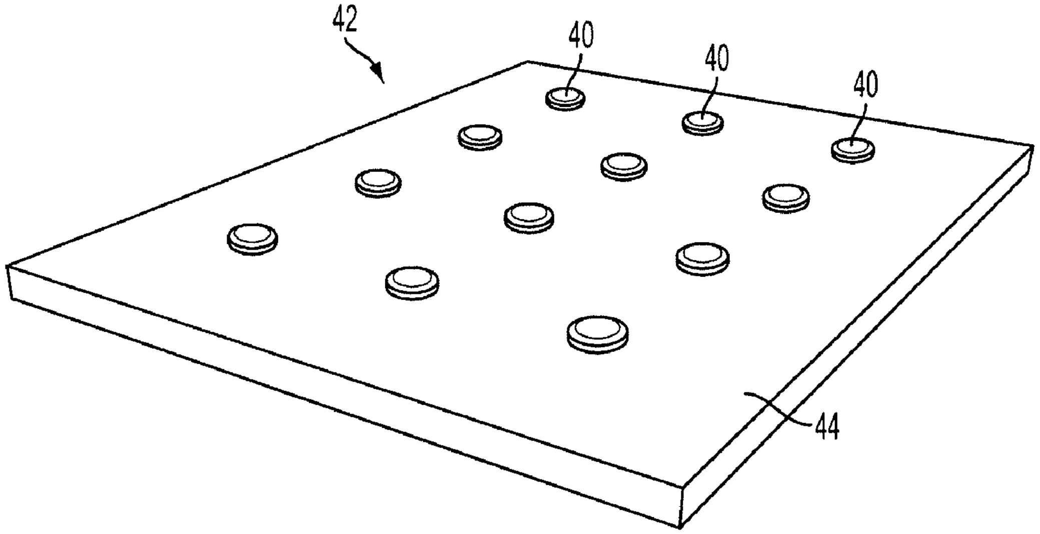
Figure 3B:
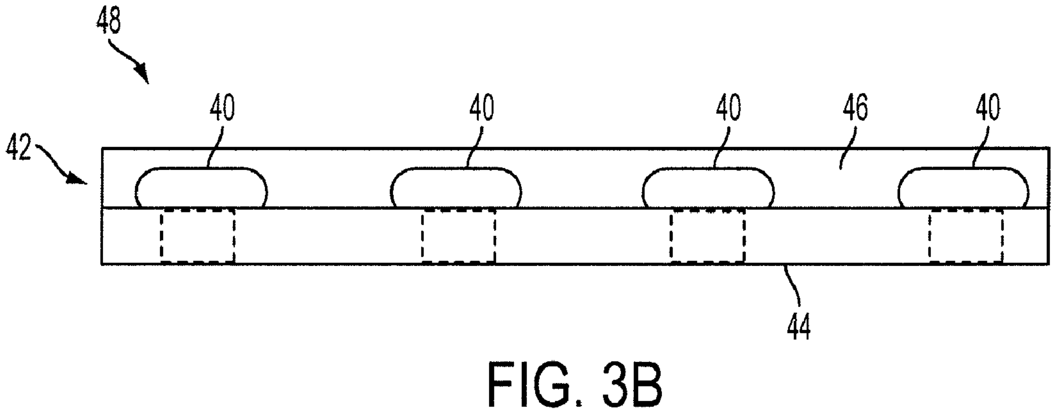
Figure 4A:
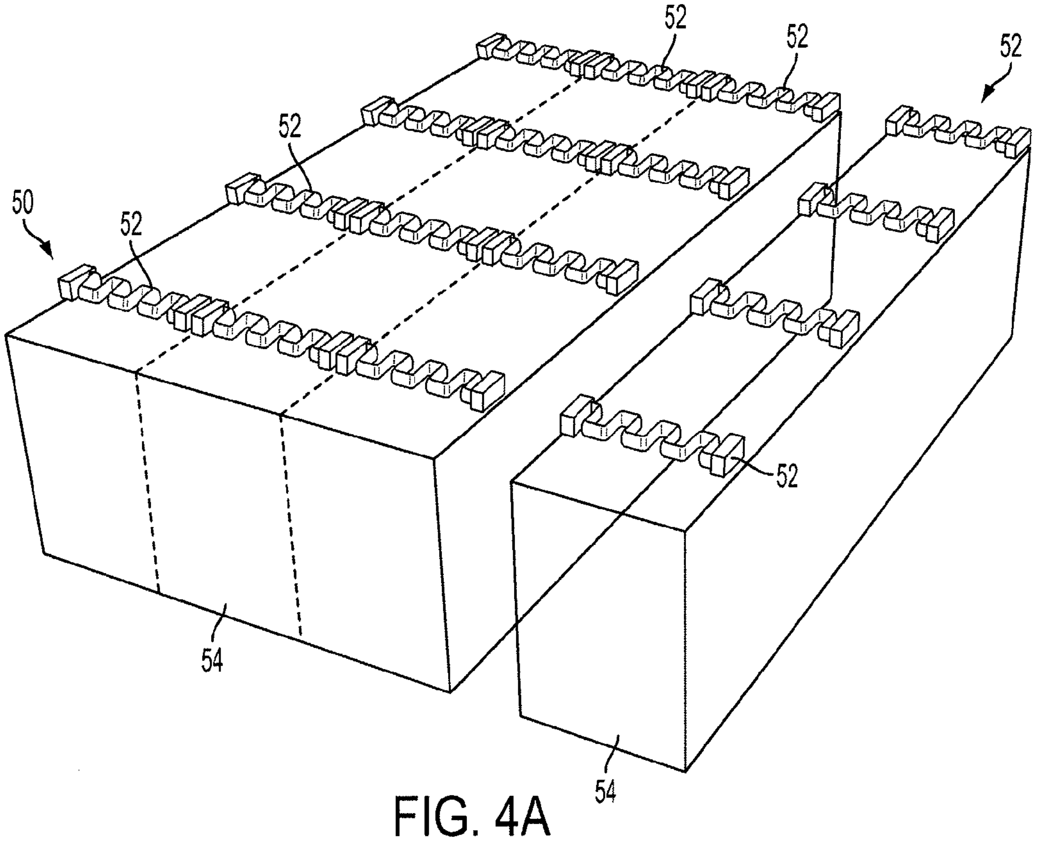
Figure 4B:
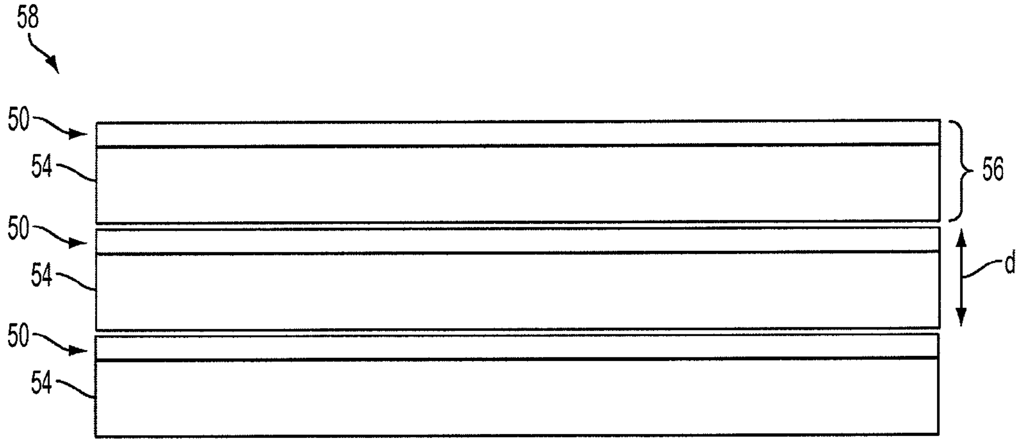
Figure 4C:
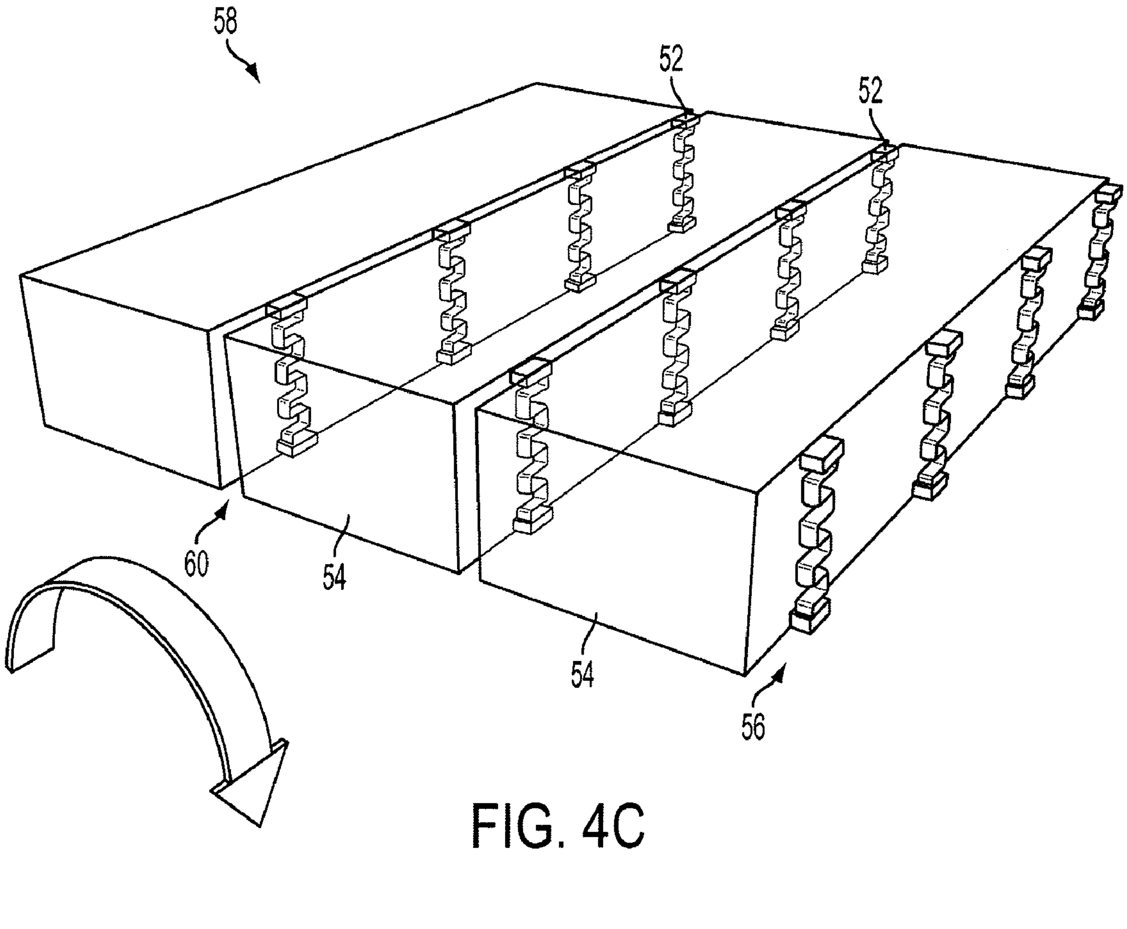
Figure 5A:
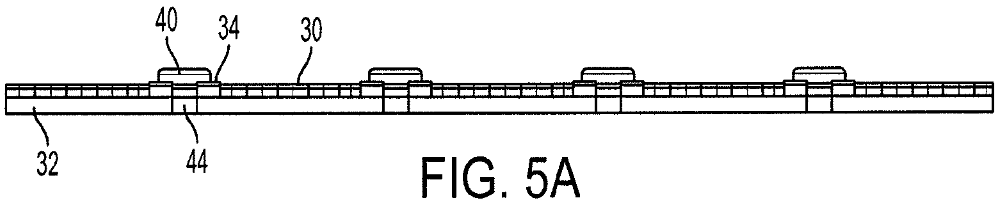
Figure 5B:
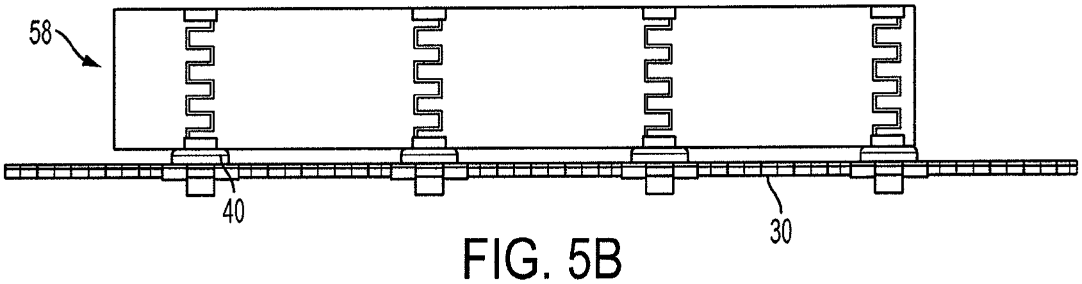
Figure 6:
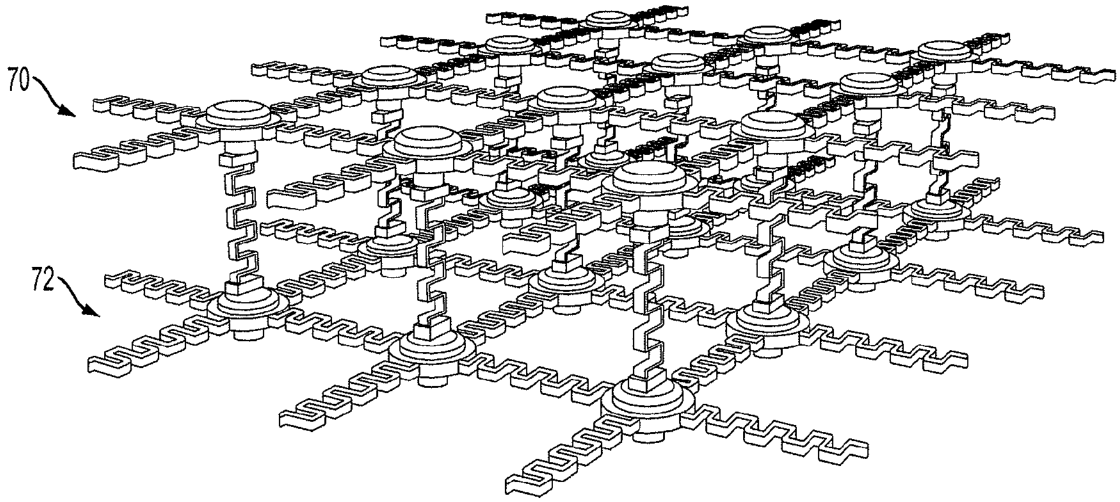
Figure 7:
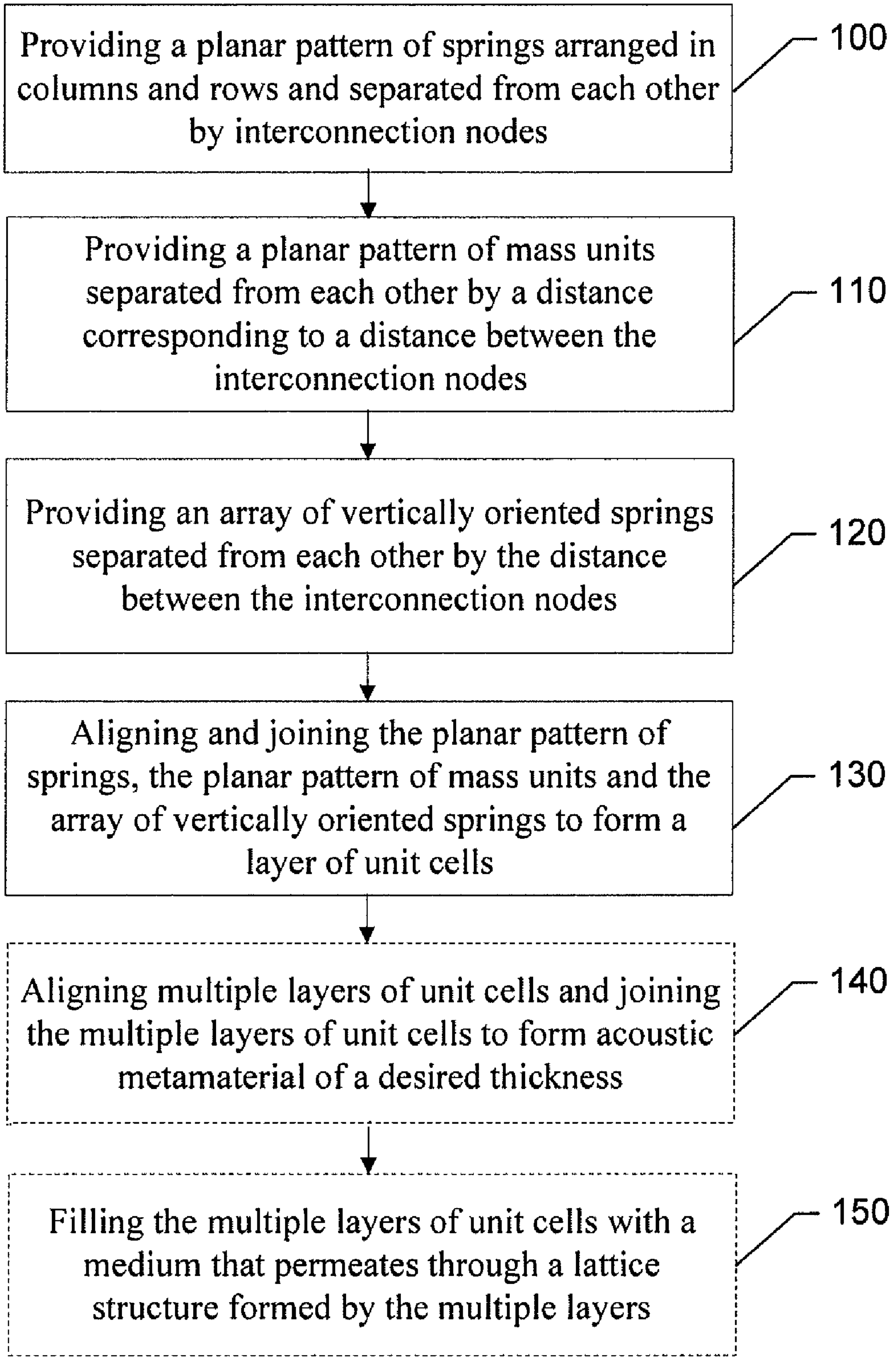

Having thus described the disclosure in general terms, reference will now be made to the accompanying drawings, which are not necessarily drawn to scale, and wherein:

FIG. 1, which is defined by FIGS. 1A and 1B, shows a six-fold connected arrangement for a plurality of unit cells and a single unit cell according to an example embodiment;

FIG. 2, which is defined by FIGS. 2A and 2B, illustrates various views of a planar pattern of interconnected springs that may be used to begin assembly of a scalable acoustic metamaterial structure of one example embodiment;

FIG. 3, which is defined by FIGS. 3A and 3B, illustrates a planar pattern of mass units for the fabrication of mass units to load into the planar pattern of springs according to an example embodiment;

FIG. 4, which is defined by FIGS. 4A, 4B and 4C, illustrates fabrication of the array of vertically oriented springs according to an example embodiment;

FIG. 5, which is defined by FIGS. 5A and 5B, illustrates the joining of intermediate layers to form the layer of cell units according to an example embodiment;

FIG. 6 illustrates an example of a first layer of unit cells and a second layer of unit cells being disposed to form acoustic metamaterial according to an example embodiment; and FIG. 7 illustrates a method for fabricating acoustic metamaterial according to an example embodiment.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

As discussed above, acoustic metamaterial may provide personnel, machines and/or components with protection from concussive or other sound wave generated forces. As such, the acoustic metamaterial may be configured to attenuate or redirect concussive forces or shockwaves. Acoustic metamaterial is artificially fabricated material that is designed to control, direct, and manipulate sound waves. Generally speaking metamaterial is fabricated to exhibit properties not normally encountered in nature. As such, metamaterial typically obtains its properties mainly on the basis of its structure and not as much on the basis of its composition. Accordingly, by structuring materials to have a specific structure, corresponding predictable properties may be exhibited by the resulting structure. In some cases, the inherent properties of certain materials may also factor into the performance of metamaterial structured in a particular way with the certain materials as components thereof. However, it is often a challenge to fabricate materials in sufficient volumes and forms to make the materials viable for use from a cost and complexity perspective.

Some embodiments of the present disclosure may provide a structure for a practical acoustic metamaterial and corresponding mechanism for providing the structure. In this regard, some embodiments may provide a network of masses that are connected to each other by springs. Each mass disposed in interior portions of the structure may be connected to six other masses adjacent thereto by six respective springs defining three pairs of springs in which springs of each pair of springs extend in opposite directions from each other along three corresponding orthogonal axes. In other words, an interior positioned mass may have six springs connected thereto, such that four springs that each lie in a plane are all perpendicular to each adjacent spring to connect the mass to four other masses in the plane and two other springs extend from the mass in opposite directions along an axis that is perpendicular to the plane. The above-described arrangement of springs may be referred to as a six-fold connected arrangement. Each six-fold connected mass and corresponding set of springs may be referred to as an acoustic metamaterial unit cell or simply a unit cell. It will be appreciated that adjacent unit cells share the spring that connects the adjacent unit cells. As such, each spring is a structural member of the two unit cells that are connected to each other by the corresponding spring.

FIG. 1, which is defined by FIGS. 1A and 1B, shows the six-fold connected arrangement for a plurality of unit cells (FIG. 1A) and for a single unit cell (FIG. 1B). As shown in FIG. 1B, a unit cell 10 includes a mass 12 that has six springs 14. Each of the springs 14 lies, as one component of a pair of springs, along one of three mutually orthogonal axes (shown in dashed lines as a first axis 16, a second axis 18 and a third axis 20). As such, the unit cell 10 defines a simple cubic lattice of masses that may be connected to each other with springs. In the cubic lattice of FIG. 1, six-fold connected unit cells may each have six springs associated therewith. However, for masses that sit at an edge of the acoustic metamaterial their corresponding unit cells may have only five springs associated therewith as no spring may be present in the direction corresponding to the edge of the metamaterial.

In an example embodiment, the masses and the springs may be selected to have different characteristics. For example, characteristics such as the value of masses at different locations, density of masses, anisotropy characteristics, the spring constants, spring masses, and host medium (or surrounding matrix material) properties of the unit cells may be independently altered. In some cases, alterations or variations with respect to the characteristics may be accomplished by instituting relatively simple geometric changes in design.

Some embodiments may be fabricated as Materials with Controlled Microstructural Architecture (MCMA) that achieve values of elastic modulus κ and/or effective density ρ that are beyond the Ashby charts and are also scalable based on the layered approach to generating the materials described herein. As such, the six-fold connected structure of unit cells shown in FIG. 1 may be achieved by utilizing mass-produced microstructure fabricating techniques with a layered approach.

FIG. 2, which is defined by FIGS. 2A and 2B, illustrates various views of a planar pattern of interconnected springs that may be used to begin assembly of a scalable acoustic metamaterial structure. FIG. 2A illustrates a top view of the planar pattern of interconnected springs and FIG. 2B illustrates a corresponding side view. As shown in FIG. 2, microlithography techniques may be used to generate a series of springs 30 on a substrate 32. In some examples, photolithography and meso/micro-patterning processes may be batch processed with selected materials to form the springs 30 on the substrate 32. Although the use of a substrate is not required, the substrate 32 may be a useful platform upon which a layer of unit cells may be formed. In some cases, the decision regarding whether to utilize a substrate may be related to the physical size of the patterns involved and the materials used, as larger patterns may be achievable without the use of a substrate.

The springs 30 may be disposed over the substrate 32 to form a grid of columns and rows that lie substantially perpendicular to each other with interconnection nodes 34 surrounding through-vias 36 separating each of the springs 30 from each other. The through-vias 36 may also extend through the substrate 32. In some embodiments, the springs 30 may be formed in a layer over the substrate 32 with an adhesive being used to hold the layers together. Alternatively, the material the springs 30 are made of may be laminated to the substrate 32 or may be deposited onto the substrate 32. The rows and columns of the springs 30 may define an x-direction and y-direction, respectively.

The springs 30 may be made from any of a plurality of different types of materials. Materials ultimately chosen to form the springs 30 may be selected based on the properties sought for the acoustic metamaterial. In this regard, the material of which the springs 30 are made may determine the effective density and stiffness of the springs 30. The geometrical parameters of the springs 30 (e.g., the width, thickness, periodicity, etc.) may also affect the effective density and stiffness. Thus, selection of characteristics of the materials and arrangement of the springs 30 may be made based on balancing design factors associated with available options against the desired final properties that are to be achieved. In this regard, metallic materials may be selected to employ springs 30 that are relatively stiff. However, a lower yield strength may be achieved by using springs 30 made from plastic materials. The sizes of the springs 30 may be selected based on the scale of the application being designed. The sizes may typically range from tens of micron level to the centimeter level in some different example embodiments.

In some embodiments, the springs 30 that are oriented in the x-direction may have the same properties as the springs 30 that are oriented in the y-direction. However, in some alternative embodiments, properties associated with springs 30 oriented in the x-direction may be different than the properties associated with the springs 30 oriented in the y-direction, if anisotropic properties are desired.

The planar pattern of springs 38 formed by depositing or otherwise positioning the springs 30 over the substrate 32 as shown in FIG. 2, may thereafter be loaded with mass elements 40. In particular, mass elements 40 may be positioned into each of the respective interconnection nodes 34. In some cases, the mass elements 40 may be formed using planar technology formed similarly to the formation of the planar pattern described in reference to FIG. 2. FIG. 3, which is defined by FIGS. 3A and 3B, illustrates a planar pattern of mass units 48 for the fabrication of mass units 40 to load into the planar pattern of springs 38. FIG. 3A illustrates a top view of a planar sheet for mass unit fabrication and FIG. 3B illustrates a side view.

The mass units 40 may have mass values and be made from materials selected from a variety of options. Densities and sizes of the mass units 40 may be selected and/or adjusted to meet design requirements. As an example, denser or heavier mass units 40 may be selected from metals. In some cases, further variability for mass may be available by selecting among the known weight distributions available for different metals (e.g., with Tungsten having a larger mass than Aluminum). For lighter mass units 40, ceramic or plastic materials having corresponding desirable masses may be selected or use. The sizes of the mass units 40 may vary with the scale of the desired application. Thus, for example, the size of the mass units 40 may vary from the micron level to the centimeter scale. In some embodiments, a two layer material in sheet form may be used for fabrication of the mass units 40. A top layer 42 may be patterned to form circular patterns. The circular patterns of the top layer 42 (that will form the mass units 40) may be dimensioned to have a diameter that is larger than the diameter of the through-vias 36. The mass units 40 of the circular pattern defined in the top layer 42 may be disposed over a substrate 44.

In some embodiments, all mass units 40 may have the same diameter. However, in other embodiments, the diameters of the mass units may be systematically varied in order to create mass gradients if such gradients are desired for a particular application. After patterning the top layer 42 over the substrate 44, a carrier layer 46 may be deposited (e.g., by being spun, sprayed, etc.) to cover and hold the top layer 42 in place. The substrate 44 may then be patterned with the same pattern provided for the top layer 42, but with a diameter that is smaller than the through-vias 36. Remaining portions of the substrate 44, after patterning as described above, are shown in dashed lines in FIG. 3B.

After the planar pattern of springs 38 and the planar pattern of mass units 48 have each been formed, another layer of springs may be formed in order to join mass units arrayed in a horizontal plane to other mass units in a vertical direction. The additional layer of springs may include an array of vertically oriented springs. In this regard, in reference to the x-direction and y-direction in which the columns and rows of the planar pattern of springs were arrayed, the additional layer of springs of the array of vertically oriented springs may include an array of springs that, although being fabricated initially in a horizontal orientation, includes sequences of springs that may be assembled to be oriented in the z-direction (i.e., orthogonal to both the x-direction and the y-direction) or along a vertical axis. The springs, prior to assembly of the sequences of springs in the array of vertically oriented springs, may be made of the same or different materials and with the same or different characteristics as the springs in the planar array of springs since they are formed independently of each other. As such, designers may have significant flexibility in relation to designing acoustic metamaterial having desired properties based on the geometry and material composition chosen for the springs.

FIG. 4, which is defined by FIGS. 4A, 4B and 4C, illustrates fabrication of the array of vertically oriented springs according to an example embodiment. Patterning for the array of vertically oriented springs may be accomplished in a planar mode using a two material layer system. One material layer 50 may be used to form the springs 52 and another material layer 54 may be used to assure that a lattice constant d is maintained.

After patterning the springs 52, the patterns may be singulated (along the dashed lines shown in FIG. 4A) to provide a sequence of springs 56. The spacing of the springs in the sequence of springs 56 may be set to be substantially the same as the spacing between interconnection nodes 34 of the planar pattern of springs. After singulation of a plurality of sequences of springs 56, the sequences of springs may be assembled in a vertical stack as shown in FIG. 4B in order to form an array of vertically oriented springs 58 shown in FIG. 4C. In some embodiments, a pick-and-place system may be used to form the array of vertically oriented springs 58 with relatively high accuracy and simplicity.

In some embodiments, the sequences of springs 56 may be held together by an adhesive or another bonding agent 60. In some embodiments, one or both of the material layer 54 and the bonding agent 60 may be removed after final assembly. However, in some alternative embodiments, one or both of the material layer 54 and the bonding agent 60 may be retained after final assembly. In an example embodiment, an adhesive (e.g., a cyanoacrylate adhesive or other glue with a fixed or known evaporation point such as 90 degrees Celsius) may be selected to enable removal of the adhesive by evaporation at a specific temperature.

After generation of the array of vertically oriented springs 58, the planar pattern of springs 38, the planar pattern of mass units 48 and the array of vertically oriented springs 58 may each be joined together to define a layer of cell units. FIG. 5, which is defined by FIGS. 5A and 5B, illustrates the joining of intermediate layers to form the layer of cell units. Initially, the planar pattern of springs 38 may be aligned with and joined to the planar pattern of mass units 48. In this regard, when the planar pattern of mass units 48 defined by the top layer 42 forming mass units 40 having diameters larger than the through-vias 36 is put together with the planar pattern of springs 38 having the interconnection nodes 34, the substrate 44 of the planar pattern of mass units 48 may fit in the through-vias 36 until the mass units 40 are seated in the interconnection nodes 34 (since the mass units 40 have a larger diameter than the interconnection nodes 34). The substrate 44 of the planar pattern of mass units may then be substantially aligned with the substrate 32 of the planar pattern of springs 38. The result of this joining process is shown in FIG. 5A. In some cases, the carrier layer 46 may then be removed (by being dissolved, etched or undergoing any other suitable removal process) to expose the mass units 40 which have been disposed in the planar pattern of springs 38 at the interconnection nodes 34.

In some embodiments, the mass units 40 may be bonded to the interconnection nodes 34 using an adhesive or other bonding agent such as a eutectic metal alloy. Thereafter, the array of vertically oriented springs 58 may be aligned with and attached to the composite structure of the planar pattern of springs 38 and remaining portions of the planar pattern of mass units 48 as shown in FIG. 5B. The array of vertically oriented springs 58 may be aligned such that each of the springs 52 is attached to a respective one of the mass units 40.

The result of the joining of the array of vertically oriented springs 58 to the planar pattern of mass units 48 and the planar pattern of springs 38, will be to provide one layer of unit cells arranged in a plane. The substrates (44 and 32) may be removed after the layer of unit cells is formed. However, the substrates could alternatively not be used at all or be removed at another time during the process.

Additional layers of unit cells may be aligned such that mass units in a higher layer are aligned with vertically oriented springs of a prior layer to grow a cubic lattice of six-fold connected mass units in acoustic metamaterial of any desirable size. FIG. 6 illustrates an example of a first layer of unit cells 70 and a second layer of unit cells 72 being disposed to form acoustic metamaterial. Since most manufacturing processes can handle large planar layers, there is typically no intrinsic limitation in the x-y plane size of the acoustic metamaterial that may be formed. However, there may be a tradeoff between the size of the planar layer and the geometrical pattern resolution in some cases. No radical changes are anticipated over a scale of about four to five orders of magnitude in the size of the unit cell for some embodiments. In some embodiments, a fabricated cubic lattice formed as described above may be filled with a medium that may permeate the whole material and keep it mechanically robust.

As indicated above, the characteristics of the masses and springs may be varied in order to achieve the desired resulting acoustic metamaterial characteristics. Thus, for example, acoustic metamaterial having a negative elastic modulus and/or a negative effective density that may be useful as shock penetration resistant material may be designed. As such, cloaking coatings having fluid-like behavior may be formed by minimizing the effective shear modulus in metamaterial and controlling the density and bulk modulus. Acoustic metamaterial may therefore be provided to manipulate sound with materials produced in scalable sizes to perform collimation, focusing, cloaking, sonic screening, provide extraordinary transmission and other manipulations. Imaging below the diffraction limit using passive elements may also be achievable using acoustic superlenses or magnifying hyperlenses. Accordingly, marked enhancements in the capabilities of underwater sonar sensing, medical ultrasound imaging and non-destructive materials testing may be achieved.

FIG. 7 illustrates a method for fabricating acoustic metamaterial according to an example embodiment. The method may include providing a planar pattern of springs arranged in columns and rows and separated from each other by interconnection nodes at operation 100. The method may further include providing a planar pattern of mass units separated from each other by a distance corresponding to a distance between the interconnection nodes at operation 110 and providing an array of vertically oriented springs separated from each other by the distance between the interconnection nodes at operation 120. The method may further include aligning and joining the planar pattern of springs, the planar pattern of mass units and the array of vertically oriented springs to form a layer of unit cells at operation 130.

The term "vertically oriented" should be understood to define an orientation relative to the planar components (e.g., perpendicular to the planar components). Thus, the term "vertically" should be understood in the context of a horizontally oriented plane for the planar pattern of springs and the planar patter of mass units. These terms "planar" and "vertically" therefore provide orientation information in relative terms and not in absolute terms. As such, if the planes were instead vertically or diagonally oriented, the "array of vertically oriented springs" would then be understood, relative to the vertical or diagonal orientation of the planes, to have an orientation perpendicular to the planes (e.g., either horizontal or diagonal, respectively).

In some embodiments, certain ones of the operations above may be modified or further amplified as described below. Moreover, in some embodiments additional optional operations may also be included (examples of which are shown in dashed lines in FIG. 7). It should be appreciated that each of the modifications, optional additions or amplifications below may be included with the operations above either alone or in combination with any others among the features described herein. In this regard, for example, the method may further include aligning multiple layers of unit cells and joining the multiple layers of unit cells to form acoustic metamaterial of a desired thickness at operation 140. In some cases, the method may further include filling the multiple layers of unit cells with a medium that permeates through a lattice structure formed by the multiple layers at operation 150.

In some embodiments, joining the multiple layers may include joining multiple layers in which spring characteristics or mass characteristics of different layers have different properties. In an example embodiment, providing the planar pattern of springs may include forming a plurality of springs on a substrate having through-vias disposed to correspond to each of the interconnection nodes. In some cases, providing the planar pattern of springs may include forming the plurality of springs such that springs extending in a column direction have different spring characteristics than springs extending along a row direction. In an example embodiment, providing the planar pattern of springs may include forming the plurality of springs such that springs extending in a column direction have the same spring characteristics as springs extending along a row direction. In some cases, providing the planar pattern of mass units may include forming a plurality of mass units on a substrate and removing portions of the substrate to leave remaining portions of the substrate at locations corresponding to the distance between the interconnection nodes. In an example embodiment, providing the planar pattern of mass units may include forming a plurality of mass units on a substrate and covering the mass units with a carrier material that is removed after the planar pattern of mass units is combined with the planar pattern of springs. In some embodiments, providing the planar pattern of mass units may include forming the mass units to have a diameter larger than a diameter of through-vias positioned in a substrate on which springs of the planar pattern of springs are formed at locations corresponding to the interconnection nodes. In an example embodiment, providing the planar pattern of mass units may include forming the mass units to different sizes to define a mass gradient. In some embodiments, providing the array of vertically oriented springs may include forming a plurality of sequences of springs on a material having a width corresponding to a lattice constant (the springs within each sequence of springs being spaced apart from each other by the distance between the interconnection nodes), singulating the sequences of springs from each other, and arranging the sequences of springs adjacent to each other such that they are separated from each other by the material defining the width corresponding to the lattice constant. In some embodiments, providing the planar pattern of springs, providing the planar pattern of mass units and providing the array of vertically oriented springs may include utilizing lithography to form the planar pattern of springs, the planar pattern of mass units and the array of vertically oriented springs. In an example embodiment, aligning and joining the planar pattern of springs and the planar pattern of mass units may include aligning a portion of a substrate on which the mass units are formed with a corresponding through-via disposed corresponding to the interconnection nodes in a substrate on which the planar pattern of springs is formed, the portion having a diameter less than a diameter of the through via to enable insertion of the portion into the through-via.

Accordingly, some example embodiments may provide a scalable, versatile and flexible mechanism by which to make acoustic metamaterial in mass-producible quantities. Thus, rather than simply providing a theoretical basis for understanding the capabilities of acoustic metamaterial, the processes described herein may enable practical employment of acoustic metamaterials. Effective material parameters may be retrievable from full field simulations. By providing unit cell structures that may be assembled into a lattice at the micro level, a scalable material may be provided at the macro level having the properties desired. Stress and strain fields provided by Multiphysics by COMSOL®, a finite element numerical solution package, may be inverted to obtain the effective shear modulus of the acoustic metamaterial sample, a parameter that may be controlled in some embodiments. For example, cloaking coatings may require a fluid-like behavior and thus, it may be desirable to minimize the effective shear modulus in metamaterial the composes the coating in addition to controlling the density and bulk modulus.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for fabricating an acoustic metamaterial comprising:

- providing a planar pattern of springs arranged in columns and rows and separated from each other by interconnection nodes;
- providing a planar pattern of mass units separated from each other by a distance corresponding to a distance between the interconnection nodes;
- providing an array of springs separated from each other by the distance between the interconnection nodes, the array of springs being formed independently of the planar pattern of springs and being oriented perpendicular to the planar pattern of springs and the planar pattern of mass units; and
- aligning and joining the planar pattern of springs, the planar pattern of mass units and the array of springs to form a layer of unit cells.

2. The method of claim 1, further comprising aligning multiple layers of unit cells and joining the multiple layers of unit cells to form acoustic metamaterial of a desired thickness.

3. The method of claim 2, wherein joining the multiple layers comprises joining multiple layers in which spring characteristics or mass characteristics of different layers have different properties.

4. The method of claim 2, further comprising filling the multiple layers of unit cells with a medium that permeates through a lattice structure formed by the multiple layers.

5. The method of claim 1, wherein providing the planar pattern of mass units comprises forming a plurality of mass units on a substrate and removing portions of the substrate to leave remaining portions of the substrate at locations corresponding to the distance between the interconnection nodes.

6. The method of claim 1, wherein providing the planar pattern of mass units comprises forming a plurality of mass units on a substrate and covering the mass units with a carrier material that is removed after the planar pattern of mass units is combined with the planar pattern of springs.

7. The method of claim 1, wherein providing the planar pattern of mass units comprises forming the mass units to have a diameter larger than a diameter of through vias positioned in a substrate on which springs of the planar pattern of springs are formed at locations corresponding to the interconnection nodes.

8. The method of claim 1, wherein providing the planar pattern of mass units comprises forming the mass units to different sizes to define a mass gradient.

9. The method of claim 1, wherein providing the array of vertically oriented springs comprises:

- forming a plurality of sequences of springs on a material having a width corresponding to a lattice constant, the springs within each sequence of springs being spaced apart from each other by the distance between the interconnection nodes;
- singulating the sequences of springs from each other; and
- arranging the sequences of springs adjacent to each other such that they are separated from each other by the material defining the width corresponding to the lattice constant.

10. The method of claim 1, wherein providing the planar pattern of springs, providing the planar pattern of mass units and providing the array of vertically oriented springs comprises utilizing lithography to form the planar pattern of springs, the planar pattern of mass units and the array of vertically oriented springs.

11. The method of claim 1, wherein aligning and joining the planar pattern of springs and the planar pattern of mass units comprises aligning a portion of a substrate on which the mass units are formed with a corresponding through-via disposed corresponding to the interconnection nodes in a substrate on which the planar pattern of springs is formed, the portion having a diameter less than a diameter of the through-via to enable insertion of the portion into the through-via.

12. The method for fabricating an acoustic metamaterial comprising:

- providing a planar pattern of springs arranged in columns and rows and separated from each other by interconnection nodes, wherein providing the planar pattern of springs comprises forming a plurality of springs on a substrate having through-vias disposed to correspond to each of the interconnection nodes;
- providing a planar pattern of mass units separated from each other by a distance corresponding to a distance between the interconnection nodes;
- providing an array of springs separated from each other by the distance between the interconnection nodes and oriented perpendicular to the planar pattern of springs and the planar pattern of mass units; and
- aligning and joining the planar pattern of springs, the planar pattern of mass units and the array of springs to form a layer of unit cells.

13. The method of claim 12, wherein providing the planar pattern of springs comprises forming the plurality of springs such that springs extending in a column direction have different spring characteristics than springs extending along a row direction.

14. The method of claim 12, wherein providing the planar pattern of springs comprises forming the plurality of springs such that springs extending in a column direction have the same spring characteristics as springs extending along a row direction.

15. An acoustic metamaterial comprising:

a cubic lattice of mass units;

a first array of springs lying in a first plane, the first array of springs being disposed to connect each mass unit therein to one adjacent mass unit lying in the first plane with a corresponding one of the springs, each of the springs connected to a particular mass unit extending in a direction substantially perpendicular to a direction of extension of an adjacent spring connected to the particular mass unit;

at least a second array of springs lying in a second plane that is parallel to the first plane, the second array of springs connecting each mass unit therein to one adjacent mass unit lying in the second plane; and a plurality of springs disposed substantially perpendicular to the first and second planes and arranged to connect mass units lying in the first plane to respective adjacent mass units lying in the second plane.

16. The acoustic metamaterial of claim 15, wherein each of the mass units has the same mass and each of springs has the same spring characteristics.

17. The acoustic metamaterial of claim 15, wherein mass units or springs in the first array have different mass values or spring characteristics than mass units or springs in the second array.

18. The acoustic metamaterial of claim 15, wherein mass units or springs in the first array have different mass values or spring characteristics than other mass units or springs in the first array.

19. The acoustic metamaterial of claim 15, wherein the first array and the second array are formed independently of each other.

20. The acoustic metamaterial of claim 15, wherein the first array of springs are separated from each other by interconnection nodes, and wherein the acoustic metamaterial defines a plurality of through vias that correspond to respective interconnection nodes.

* * * * *